Jan. 26, 1965  R. R. MONTPEAT  3,166,793
ACTUATING DEVICE FOR INJECTION PLUNGERS
Filed April 3, 1963

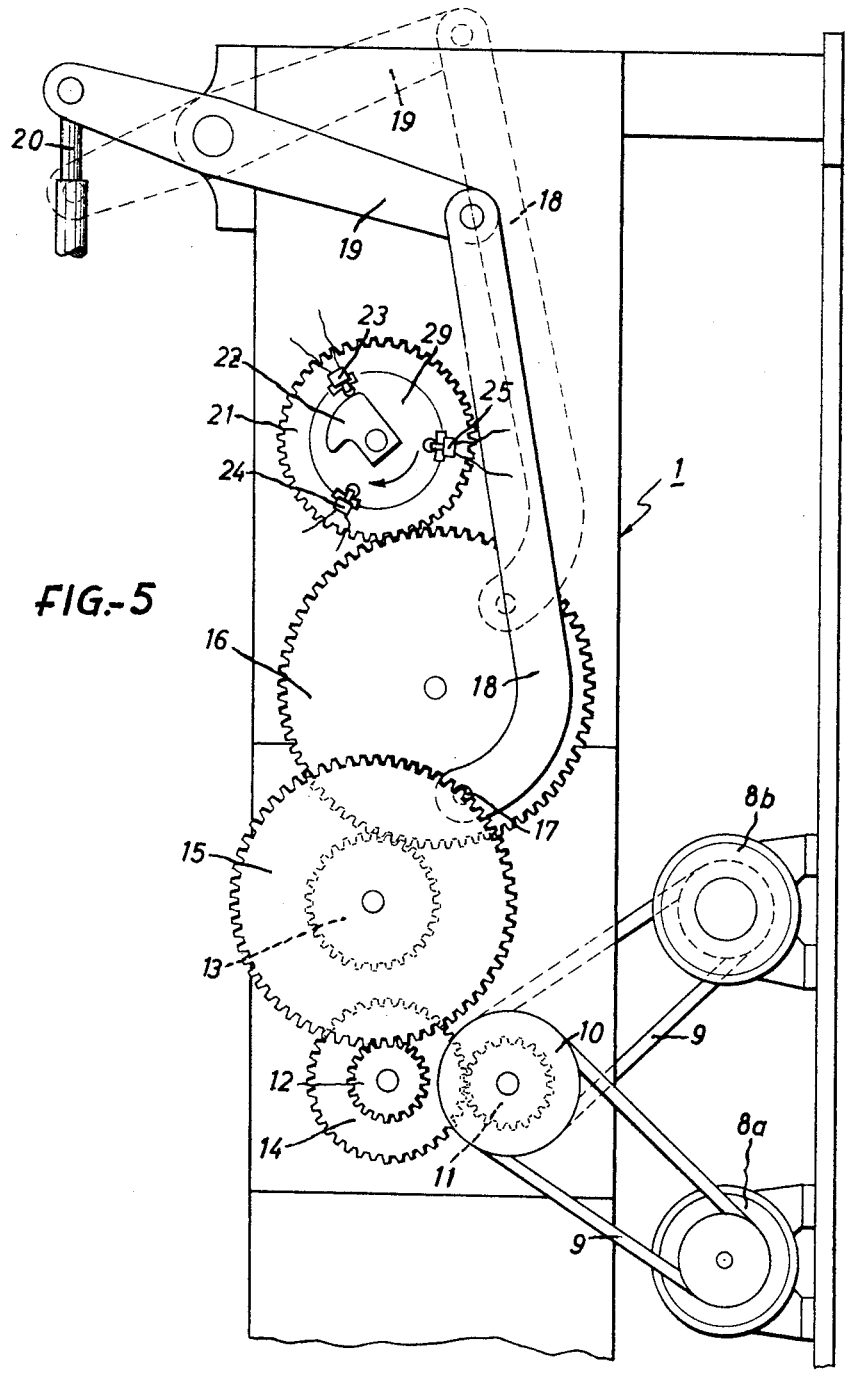

Jan. 26, 1965  R. R. MONTPEAT  3,166,793
ACTUATING DEVICE FOR INJECTION PLUNGERS
Filed April 3, 1963  3 Sheets-Sheet 3

United States Patent Office 3,166,793
Patented Jan. 26, 1965

3,166,793
ACTUATING DEVICE FOR INJECTION
PLUNGERS
Ramon Rocafort Montpeat, Avenida General Mitre 140,
Barcelona, Spain
Filed Apr. 3, 1963, Ser. No. 270,308
Claims priority, application Spain, Feb. 13, 1961,
264,849; Mar. 25, 1963, 286,381
5 Claims. (Cl. 18—30)

This patent of invention relates to improvements in the actuation of apparatus for the manufacture of plastic articles by multiple injection and is a continuation-in-part application of Serial No. 169,342 filed January 29, 1962, now abandoned.

In view of the constant increase in the use of plastic articles, there is a corresponding continuous increase in the number of articles of domestic and industrial use which cease to be manufactured from conventional materials and are instead manufactured from plastics. Among such articles there are many which have zones of different coloration or strength, such as artificial flowers, and which require a form of injection, which is not simultaneous but is in the same phase, of plastic substances having different physical characteristics.

For multiple injection of this kind various apparatus have been developed and are already used, some of them designed with this object in view and others being, in reality, an assembly of various single or simple injection machines connected together for the purpose of achieving the proposed result.

In U.S. Patent 3,061,879 the inventor has described a multiple injection apparatus for forming many colored pieces of flowers in plastic material. Whereas the apparatus is working very effectively, it has been found that the actuating means thereof are subject to an excessive wear. The present invention has been developed to obtain an actuating device which can be applied to the apparatus claimed in U.S. Patent 3,061,879 and which, while maintaining a high degree of precision and an ample capacity for regulation of the phase displacement of the plungers, has little wear.

Essentially, the present invention is characterised in that the plunger of each injection cylinder is actuated by an electric motor via one reducing transmission by toothed wheels for each cylinder and a multiple lever device. The said multiple lever device constitutes a kinematic chain articulated by one of its ends to a free end of the plunger, thus producing the axial displacement thereof, and connected at the other of its ends, again in articulated fashion and in this case eccentrically, to a transmission wheel to which a movement of alternating rotation is imparted, the angle through which the wheel rotates in each half-period being less than 180° and the said alternating movement being achieved by an arrangement whereby in each transmission one of the wheels meshes with another wheel carrying an actuating arm. The arm of one of the transmissions is adapted to contact three switches, a first switch for stopping a first plunger at the end of its injection stroke, a second switch for stopping said first plunger at the end of its feed stroke and a third switch for setting in motion a second plunger; whereas the arm of the other transmission is adapted to contact two switches, a switch for stopping said second plunger at the end of its injection stroke and a further switch for stopping said second plunger at the end of its feed stroke, in each set of switches means being provided adapted to adjust the relative position of the switches of each set with respect to each of the other switches of the same set, in order to provide adjustment of the injection and feed strokes as well as the phase displacement of the second plunger with respect to the first plunger.

Preferably, the switches for stopping each plunger at the end of its injection and feed strokes are disposed in accordance with an arc of a circle concentric with the axis of rotation of said actuating arm, whereas the switch for setting in motion the electric motor of one of the plungers is disposed between the switches for stopping the electric motor of the other plunger.

Finally, it is a further provision that the multiple lever device for each injection cylinder consists of a movable lever articulated to the base of the machine and one of the ends of which is connected to a connecting bar (preferably a double bar) which is connected to eccentric studs provided in the last transmission wheel whereas its other end is connected, again by means of a double articulation system comprising a connecting bar, to one end of the corresponding plunger along an axis intersecting normally with the longitudinal axis of the said plunger.

In order to facilitate understanding of these ideas while simultaneously disclosing various details of a constructional nature, an embodiment of the present invention is described hereinbelow with reference to the accompanying drawings which, being entirely of an illustrative character, are to be understood to be entirely non-limitative relatively to the scope of protection requested. In the said drawings:

FIGURE 5 shows, diagrammatically, an elevational view of one of the two transmissions of the machine shown in the preceding figures;

Figure 1:
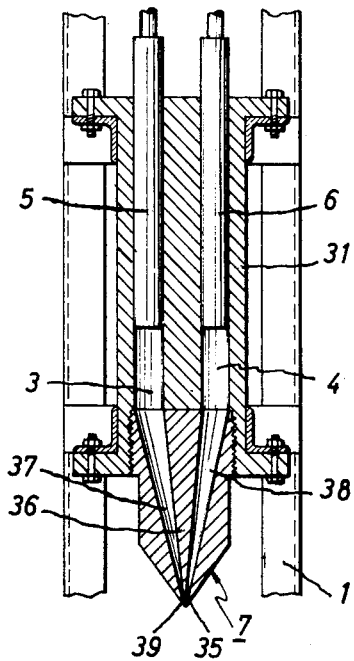
FIGURE 1 shows a partial section through a double injection machine.
Figure 2:
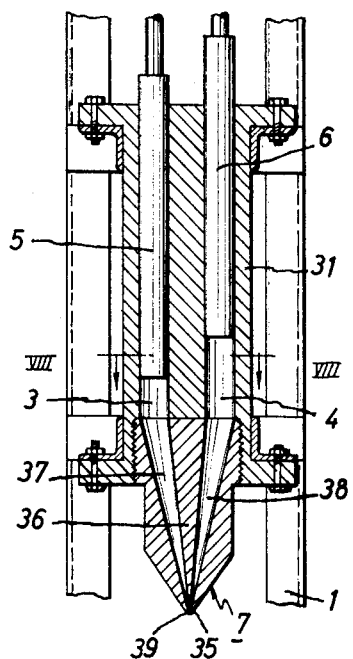
FIGURE 2 shows the same section, in the phase displaced position of the injection plungers.
Figure 3:
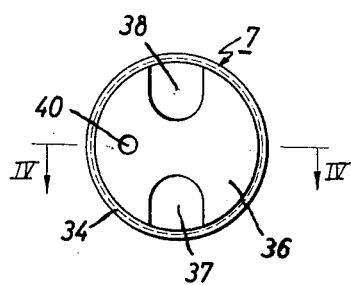
FIGURE 3 is a view of that portion of the nozzle contacting the injection cylinders.
Figure 4:
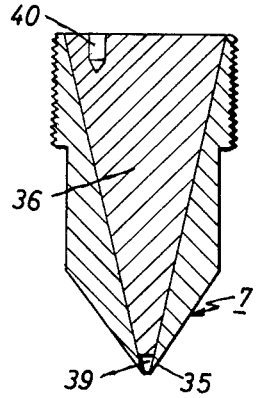
FIGURE 4 shows a section along the line IV—IV of the previous figure.
Figure 7:
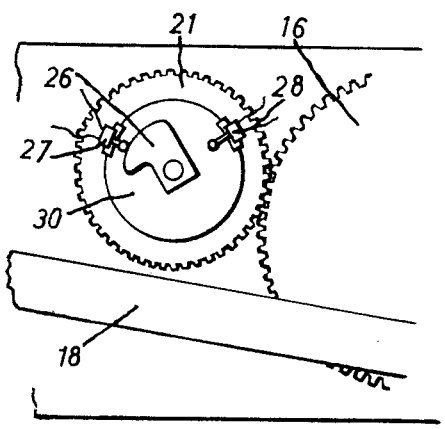
FIGURE 7 shows, diagrammatically, a partial elevational view of the second transmission of the machine showing the part thereof having the switches.
Figure 6:
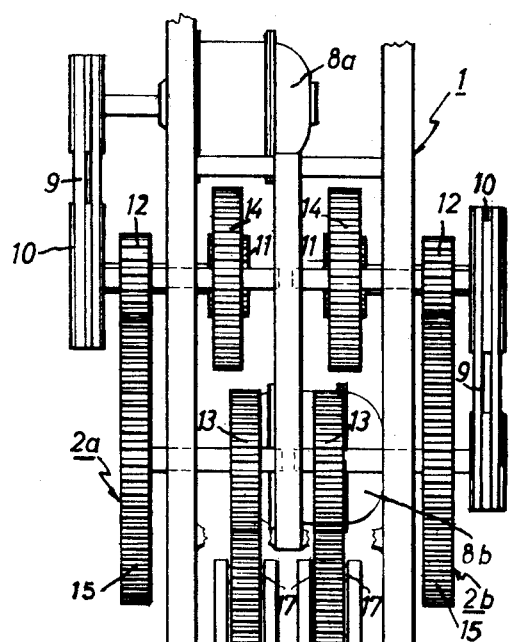
FIGURE 6 shows a plan view of the machine showing the two transmissions.
Figure 8:
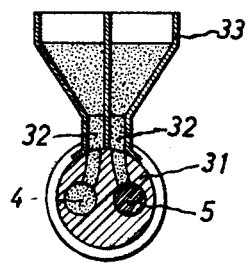
FIGURE 8 shows a section along line VIII—VIII of FIG. 2.

In accordance with the said figures and the reference numerals thereof which indicate the various parts and details, the description of the machine is as follows:

The machine consists of a base 1, two transmissions 2a and 2b, two injection cylinders 3 and 4, the corresponding plungers 5 and 6, and the injection nozzle 7.

Each transmission 2a and 2b, to which the improvements forming the subject of the present patent relate, consists of a reversible electric motor 8a, 8b, which by means of a set of trapezoidal belts 9, actuates the pulley 10 which, by means of the toothed driving wheels 11, 12 and 13 actuates the corresponding driven wheels 14, 15, and 16, the wheel 16 being provided with eccentric studs 17 articulated to which are the ends of a connecting double bar 18 whereas the other ends thereof are articulated to the lever 19, articulated relatively to the base 1 of the machine and actuating by its other free end the corresponding plunger 5 or 6 to which it is connected by the double-articulated arm 20.

The wheel 16 of the transmission 2a meshes with a wheel 21a provided with a diametral arm 22 fastened to the integral shaft 21c thereof, said diametral arm 22 actuating the switch 23 for stopping electric motor 8a, and, therefore, plunger 5, at the end of the feed stroke thereof, the switch 24 for stopping electric motor 8a, and, therefore, plunger 5, at the end of the injection stroke thereof, and the switch 25 for setting in motion electric motor 8b, and, therefore, plunger 6 at the beginning of the injection stroke thereof. The toothed wheel 16 of transmission 2b meshes with a wheel 21b provided with a diametral arm 26 fastened to the integral shaft 21d thereof, said diametral arm 26 actuating the switch 27 for stopping electric motor 8b, and, therefore, plunger 6, at the end of the feed stroke thereof, and the switch 28 for stopping electric motor 8b, and, therefore, plunger 6, at the end of the injection stroke thereof. The above two sets of switches 23–24–25 and 27–28 are respectively adjustably mounted on circular supports 29 and 30 fastened to the apparatus base 1 on the sides thereof. Integral shafts 21c and 21d can freely turn in a hole provided in the center of circular supports 29 and 30 through which said shafts pass. As mentioned above, the relative position of each switch with respect to the other switch or switches of the same set is capable of regulation through adjustment thereof on its corresponding circular support.

The injection cylinders 3 and 4 are secured on a block 31 and their respective axes are geometrically entirely parallel. Nevertheless, the said cylinders 3 and 4 may be completely independent of each other, i.e., they may consist of two separate cylindrical bodies, and furthermore they are not necessarily parallel. Each cylinder 3 and 4 is formed with a duct 32 for the feed of the said cylinders in proportioned form from a twin-hopper 33, an arrangement of this kind being generally used in injection machines.

The nozzle 7 consists, in the example, of an envelope 34 the end of which is secured by means of fitting screwthreads to the injection cylinders 3 and 4 whereas its opposite end terminates in a perforated tip 35. The said nozzle 7 is internally conical and is connected to a guide member 36 which is also conical and is formed with two grooves 37 and 38 extending along generatrices, the cross sections of which coincide at one end with that of the respective cylinder 3 or 4 and diminish progressively until they reach the perforated tip 35, thus forming a small collecting chamber 39. It is the purpose of the orifice 40 to contain a pivot for the block 31, so as to ensure perfect centering during assembly.

In accordance with the description given hereinabove, the mode of operation of the double injection machine illustrated by way of example will be as follows:

Assuming that both plungers 5 and 6 are in the position illustrated in FIGURE 1 and the switch 25 is made to coincide with the switch 23, the two plungers will function completely in phase and injection will be simultaneous in both. If it is desired to provide a certain phase displacement between the injections of the cylinders 3 and 4, the switch 25 is displaced into a pre-determined intermediate position, as illustrated in FIGURE 5, in such manner that, starting with the machine completely stopped in the position illustrated in FIGURE 5, the circuit of the electric motor 8a of the cylinder 3 is manually closed, by forming an electric bridge, on the stopping switch 23—for instance, by means of a conventional button switch (not shown). The electric motor 8a is thus set in motion and the wheel 16 corresponding to the cylinder 3 rotates in the direction indicated by the arrow in the said FIGURE 5, displacing the corresponding plunger 5 in the injection direction. During this injection in the cylinder 3, the plunger 6 of the cylinder 4 remains stationary, since the corresponding electric motor 8b is not started up until the arm 22 reaches the switch 25; once this has been done, the simultaneous injection of both cylinders 3 and 4 is effected until the arm 22 reaches the switch 24, at which instant the electric motor 8a of the cylinder 3 is stopped. Injection in the other cylinder 4 is meanwhile continued until arm 26 reaches switch 28, at which instant the electric motor 8b is stopped. Thus, both plungers 5 and 6 are stopped at the end of the injection stroke. The circuit of the electric motors 8a and 8b is manually closed by forming an electric bridge on switches 24 and 28—for instance by means of a conventional button switch (not shown): said electric motors 8a and 8b reverse their rotation and actuate transmissions 2a and 2b in the opposite direction, simultaneous feed in both cylinders 3 and 4 being then effected. The feed stroke ends when arms 22 and 26 reach, respectively, switches 23 and 27, after which the machine is ready for a new double injection, as described above.

The words "plastic" or "plastic material" appearing throughout the specification are meant to designate the well known synthetic mainly organic thermoplastic or thermosetting substances which can become plastic and can be molded while being solid in their final form.

Having sufficiently described the characteristics, advantages and operation of multiple-injection machines equipped with the improvements forming the subject of the present invention, it should be stated in resume that it is possible provide in connection therewith as many variations in respect of detail which experiment and practice may show to be necessary in all matters relating to materials, dimensions, number of integral elements and other accessory circumstances, provided that the essential character of the invention is not changed.

What is claimed is:

1. In two-plunger apparatus for the manufacture of articles in plastic material by double injection, an actuating device having in combination: an independent reversible electric motor for each injection plunger; a reduction toothed wheel transmission adapted to be set in motion by each electric motor, each transmission comprising a plurality of wheels; a multiple lever device constituting a kinematic chain for each plunger, one of the ends of said multiple lever device being articulated to the corresponding plunger, said device being adapted to cause the displacement of the plunger, the other end being eccentrically articulated to one wheel of the transmission, said one wheel being adapted to rotate alternatingly on being actuated by the reversible electric motor; a first end wheel meshing with said eccentrically articulated wheel of the transmission of one of the plungers, said first end wheel carrying an arm, said arm being adapted to actuate three switches by contact, said three switches being a switch for stopping the electric motor actuating the transmission of said one plunger, and, therefore, said plunger, at the end of the injection stroke thereof, a switch for stopping the electric motor actuating the transmission of said one plunger, and, therefore, said plunger, at the end of the feed stroke thereof, and a switch for setting in motion the electric motor actuating the transmission of the other plunger, and, therefore, said other plunger; and a second end wheel meshing with the eccentrically articulated wheel of the transmission of said other plunger, said second end wheel carrying an arm, said arm being adapted to actuate two switches by contact, said two switches being a switch for stopping the electric motor actuating the transmission of said other plunger, and, therefore, said other plunger, at the end of the injection stroke thereof, and a switch for stopping the electric motor actuating the transmission of said other plunger, and, therefore, said other plunger, at the end of the feed stroke thereof, each of said two sets of switches being in the path of the corresponding actuating arm.

2. An actuating device as claimed in claim 1, in which each set of switches are adjustably mounted on supporting means adapted to provide the desired adjustable separation between the said switches of each set.

3. An actuating device as claimed in claim 1, in which each set of switches are adjustably disposed in accordance with an arc of a circle concentric with the axis of rotation of the corresponding actuating arm.

4. An actuating device as claimed in claim 1, in which each set of switches is adjustably mounted on circular supporting means, said actuating arm being disposed at the end of an integral shaft of the end wheel of the corresponding transmission, said switches being disposed in the path of the free end of said actuating arm.

5. An actuating device as claimed in claim 1, in which the multiple lever device of each cylinder consists of a movable lever articulated to the machine base, one of the ends thereof being articulated to a connecting bar which is articulated to the studs of the eccentric, whereas the other end is articulated to a further connecting bar the end of which is articulated to the plunger along an axis normally intersecting the longitudinal axis of the said plunger, each set of switches being adjustably mounted on supporting means adapted to provide the desired adjustable separation between the said switches of each set.

References Cited in the file of this patent
UNITED STATES PATENTS

| | | |
|---|---|---|
| 2,418,856 | Stacy | Apr. 15, 1947 |
| 3,061,879 | Montpeat | Nov. 6, 1962 |